US007953080B2

(12) United States Patent
Lubbers et al.

(10) Patent No.: US 7,953,080 B2
(45) Date of Patent: May 31, 2011

(54) METHOD OF RECEIVING AUDIO/VIDEO SERVICES, CORRESPONDING TERMINAL AND SYSTEM

(75) Inventors: Willem Lubbers, Cesson Sevigne (FR); Eric Gautier, Rennes (FR); Rémi Houdaille, Cesson Sevigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 654 days.

(21) Appl. No.: 11/824,455

(22) Filed: Jun. 29, 2007

(65) Prior Publication Data
US 2008/0002674 A1      Jan. 3, 2008

(30) Foreign Application Priority Data
Jun. 30, 2006   (FR) ...................................... 06 52753

(51) Int. Cl.
*H04L 12/28* (2006.01)
(52) U.S. Cl. ....................................................... 370/389
(58) Field of Classification Search .................. 370/401, 370/389, 498, 352, 400, 395; 709/245, 224, 709/231, 236, 203, 206, 205, 223, 22, 232; 712/215; 713/1; 725/39, 51, 105
See application file for complete search history.

(56) References Cited

U.S. PATENT DOCUMENTS

| | | | | |
|---|---|---|---|---|
| 5,353,411 A * | 10/1994 | Nakaosa et al. | ................... | 713/1 |
| 5,884,059 A * | 3/1999 | Favor et al. | ................... | 712/215 |
| 6,751,673 B2 * | 6/2004 | Shaw | ........................... | 709/231 |
| 6,834,298 B1 * | 12/2004 | Singer et al. | ................... | 709/220 |
| 7,274,684 B2 * | 9/2007 | Young et al. | ................... | 370/352 |
| 7,533,184 B2 * | 5/2009 | Miller et al. | ................... | 709/236 |
| 2002/0009079 A1 * | 1/2002 | Jungck et al. | ................... | 370/389 |
| 2002/0124098 A1 * | 9/2002 | Shaw | ........................... | 709/231 |
| 2003/0093563 A1 * | 5/2003 | Young et al. | ................... | 709/245 |
| 2003/0191802 A1 * | 10/2003 | Zhao et al. | ................... | 709/203 |
| 2004/0064550 A1 * | 4/2004 | Sakata et al. | ................... | 709/224 |
| 2004/0083306 A1 * | 4/2004 | Gloe | ........................... | 709/245 |
| 2004/0098506 A1 * | 5/2004 | Jean | ........................... | 709/245 |
| 2005/0125560 A1 * | 6/2005 | Brockway et al. | ................... | 709/249 |
| 2005/0160172 A1 * | 7/2005 | Eytchison | ................... | 709/227 |
| 2005/0198188 A1 * | 9/2005 | Hickman | ................... | 709/217 |
| 2006/0029104 A1 * | 2/2006 | Jungck | ........................... | 370/498 |
| 2006/0187858 A1 * | 8/2006 | Kenichi et al. | ................... | 370/254 |
| 2007/0078851 A1 * | 4/2007 | Grell et al. | ........................... | 707/7 |

(Continued)

FOREIGN PATENT DOCUMENTS

WO    WO 2006/061434        6/2006

OTHER PUBLICATIONS

"Digital Video Broadcasting (DVB)" ETSI Standards, European Telecommunications Standards Institute, Sopia-Antipo, FR, vol. BC, No. V111, Mar. 2005 (21005-03), XP014033278 ISSN: 0000-0001 p. 24; figure 7* p. 25, ligne 1-p. 31, derniere ligne.

Stuart Cheshire Marc Krochmal Apple Computer et al: "DNS-Based Service Discovery" IETF Standard-Working-Draft, Internet Engineering Task Force IETP, CH, No. 3, Jun. 7, 2005, XP015041687 ISSN: 0000-0004 p. 3, 1 ligne 34-ligne 35 p. 23, ligne 28, ligne 32.

(Continued)

*Primary Examiner* — Pankaj Kumar
*Assistant Examiner* — Prenell P Jones
(74) *Attorney, Agent, or Firm* — Robert D. Shedd; Jeffrey M. Navon

(57) ABSTRACT

The invention relates to a method, a device and a system for the discovery of services according to a services entry point discovery protocol, that improves the discovery of audio/video services, in particular when several entry points, or access points, offering different services or different conditions for transmitting services can be offered to a user.

10 Claims, 9 Drawing Sheets

U.S. PATENT DOCUMENTS

| | | | |
|---|---|---|---|
| 2007/0192618 A1* | 8/2007 | Ellmore | 713/183 |
| 2007/0220574 A1* | 9/2007 | Schaefer et al. | 725/118 |
| 2008/0002674 A1* | 1/2008 | Lubbers et al. | 370/352 |
| 2008/0016233 A1* | 1/2008 | Schneider | 709/230 |
| 2008/0043761 A1* | 2/2008 | Kumar et al. | 370/401 |
| 2008/0096562 A1* | 4/2008 | Wu et al. | 455/436 |
| 2008/0256232 A1* | 10/2008 | Fleury et al. | 709/224 |

OTHER PUBLICATIONS

Stuart Cheshire Marc Krochmal Apple Computer et al: "Multicase DNS" IETF Standard-Working-Draft, Internet Engineering Task Force, IETF, CH, No. 5, Jun. 7, 2005, XP015041686 ISSN: 0000-0004 p. 10, ligne 1-ligne 26 p. 30, ligne 6-ligne 11.

* cited by examiner

PRIOR ART

METHOD OF RECEIVING AUDIO/VIDEO SERVICES, CORRESPONDING TERMINAL AND SYSTEM

1. FIELD OF THE INVENTION

The present invention pertains to the field of digital television transmission (or DVB from the English "Digital Video Broadcast"). More precisely, the invention relates to the discovery of DVB services (for example DVB-IP or DVB over IP (acronym standing for "internet protocol" defined in the document RFC791 published in September 1981)).

2. TECHNOLOGICAL BACKGROUND

DVB over IP is in particular defined in the standards ETSI TS 102 034 (entitled "*Transport of MPEG-2 Based DVB Services over IP Based Networks*" and published in March 2005).

According to the prior art, such as illustrated with regard to FIG. 1, a terminal 10 or decoder (or STB from the English "Set Top Box") allows a user to receive a video or audio stream sent by a video server 17 belonging to a network 1 of internet type, for example of ADSL (or "Asymmetric Data Subscriber Line") type. The network 1 also comprises:
  a DHCP (from the English "Dynamic Host Configuration Protocol") server 16 which allows the allocation of an IP address and a sub-network mask to the terminal 1;
  a DNS (or "Dynamic Name Resolution") server 14 specific to the network 1 and which allows the resolution of names on the basis of IP addresses and vice-versa; and
  two SD&S (or "Service Discovery and Selection protocol") servers 12 and 13 which allow the terminal 10 to discover services.

In order to simplify the description, the network 1 is represented with a single terminal. Of course, the network 1 can comprise numerous terminals suitable for receiving services.

When the terminal 10 (or its user via the terminal) wants to receive a service, it requests its IP address from the DHCP server 16 over the network 1. Then, it receives an address and is associated with a name of the domain to which it will belong. Thereafter, it implements a search for an entry point where it will be able to find services according to an EPDP protocol (or "Entry Point Discovery Protocol") with one of the servers 12 and 13. One of the servers 12 or 13 then transmits a list of services to the terminal. This procedure has the drawback of providing a relatively limited list of services.

3. SUMMARY OF THE INVENTION

The invention is aimed at alleviating these drawbacks of the prior art.

More particularly, the objective of the invention is to improve the discovery of audio and/or video services for a terminal.

For this purpose, the invention proposes a method of receiving audio/video services comprising:
  a step of transmitting a name resolution request according to an audio/video services entry point discovery protocol,
  a step of receiving a first address corresponding to a first entry point used for distributing service signalling, the first address being provided by a first name server associated with a first network via a first access point;
  a step of receiving a second address corresponding to a second entry point used for distributing service signalling, the second address being provided by a second name server associated with a second network via a second access point different from the first access point;
  a step of storing the first and second entry point addresses.

According to particular characteristics, the first and second networks are of different kinds and, for example, the first network is a wire-based network of the internet type and the second network is a wireless network.

According to a specific embodiment, the second network is of the digital video transmission network type, compatible, for example, with the DVB-S or DVB-T standard.

Advantageously, the method comprises:
  a step of connecting to a stream transmitted on the first address so as to receive a first list of service providers;
  a step of connecting to a stream transmitted on the second entry point address;

According to a particular characteristic, the method comprises:
  a step of connecting to a stream at an address belonging to the first list of service providers so as to receive a first list of services;
  a step of connecting to a stream at an address belonging to the second list of service providers so as to receive a second list of services;

According to an advantageous characteristic, the method comprises:
  a step of selecting a first service belonging to the first list of services or a second service belonging to the second list, and
  a step of receiving the selected service, by the first access point if the first service is selected and by the second access point if the second service is selected.

The invention also relates to a terminal comprising:
  means for transmitting a name resolution request according to an audio/video services entry point discovery protocol,
  means for receiving a first entry point address used for distributing service signalling, the first address being provided by a first name server associated with a first network via a first access point;
  means for receiving a second entry point address used for distributing service signalling, the second address being provided by a second name server associated with a second network via a second access point different from the first access point; and
  means for storing the first and second service lists distribution addresses.

The invention relates, furthermore, to a system comprising at least one terminal such as described above and at least one gateway which itself comprises the second name server.

4. LIST OF FIGURES

The invention will be better understood, and other features and advantages will appear on reading the description which follows, the description referring to the appended drawings among which:

FIG. 1 already described illustrates a communication network known per se;

Figure 1:
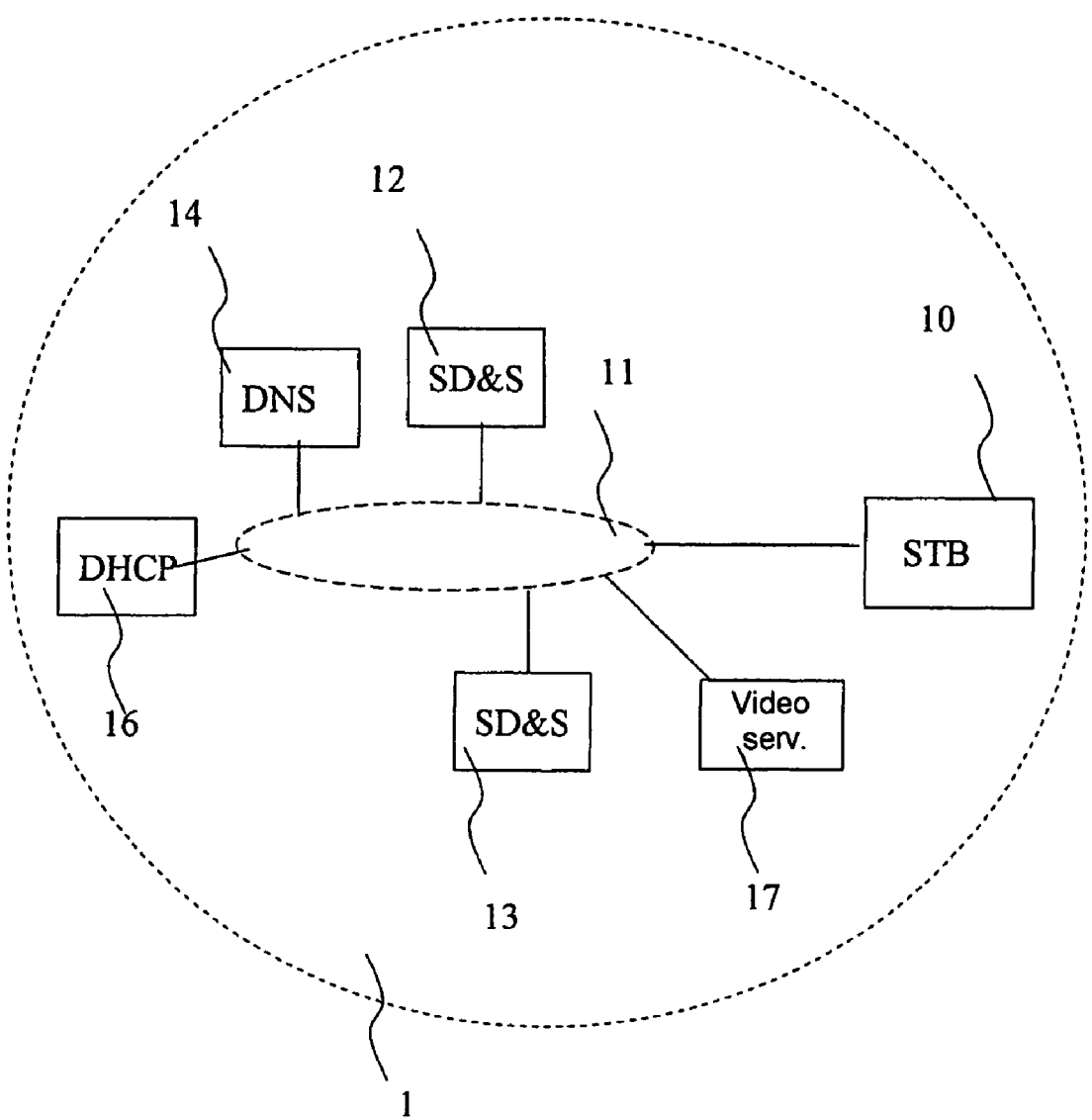
Figure 2:
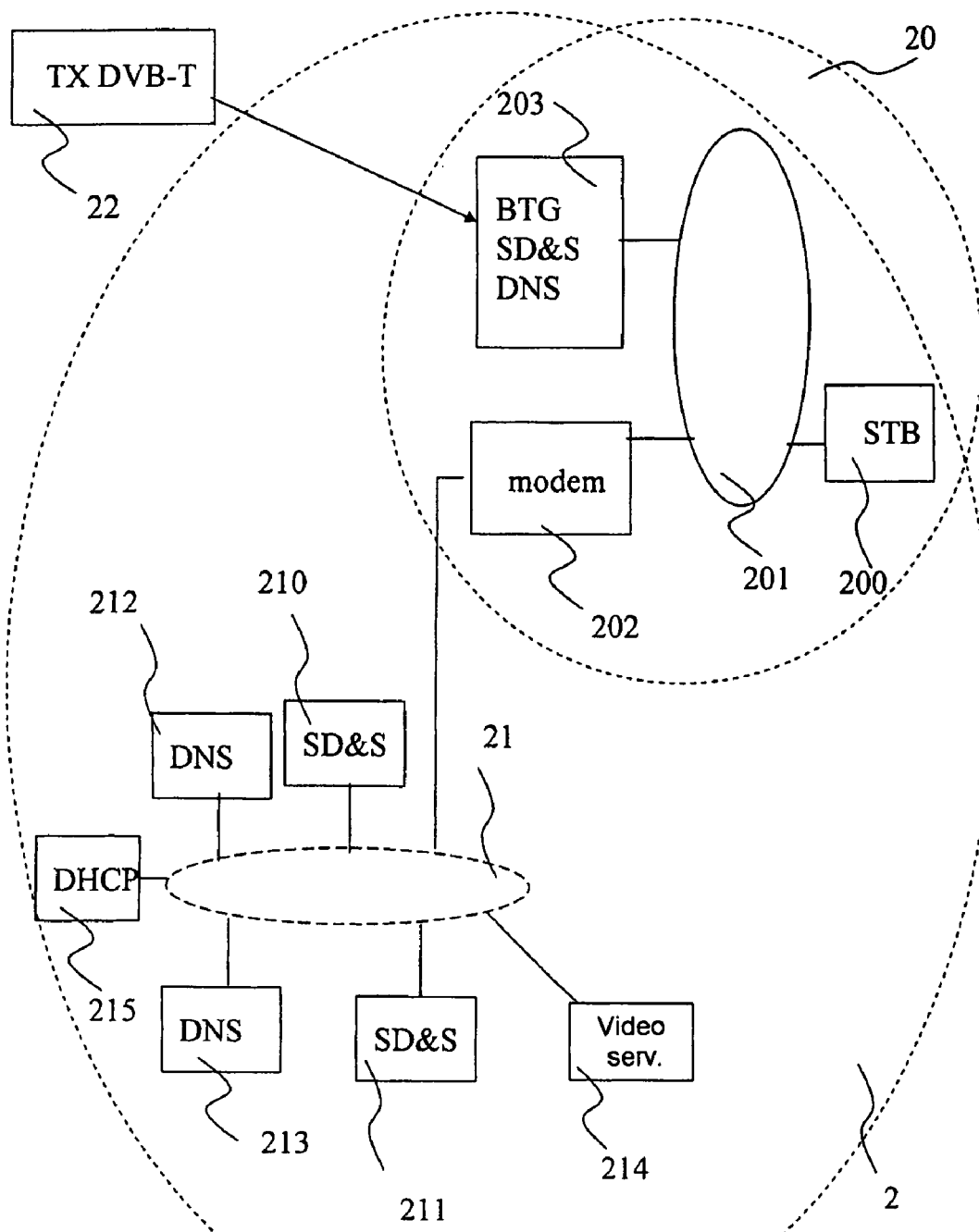
FIGS. 2 and 3 represent communication networks according to two embodiments of the invention.
Figure 3:
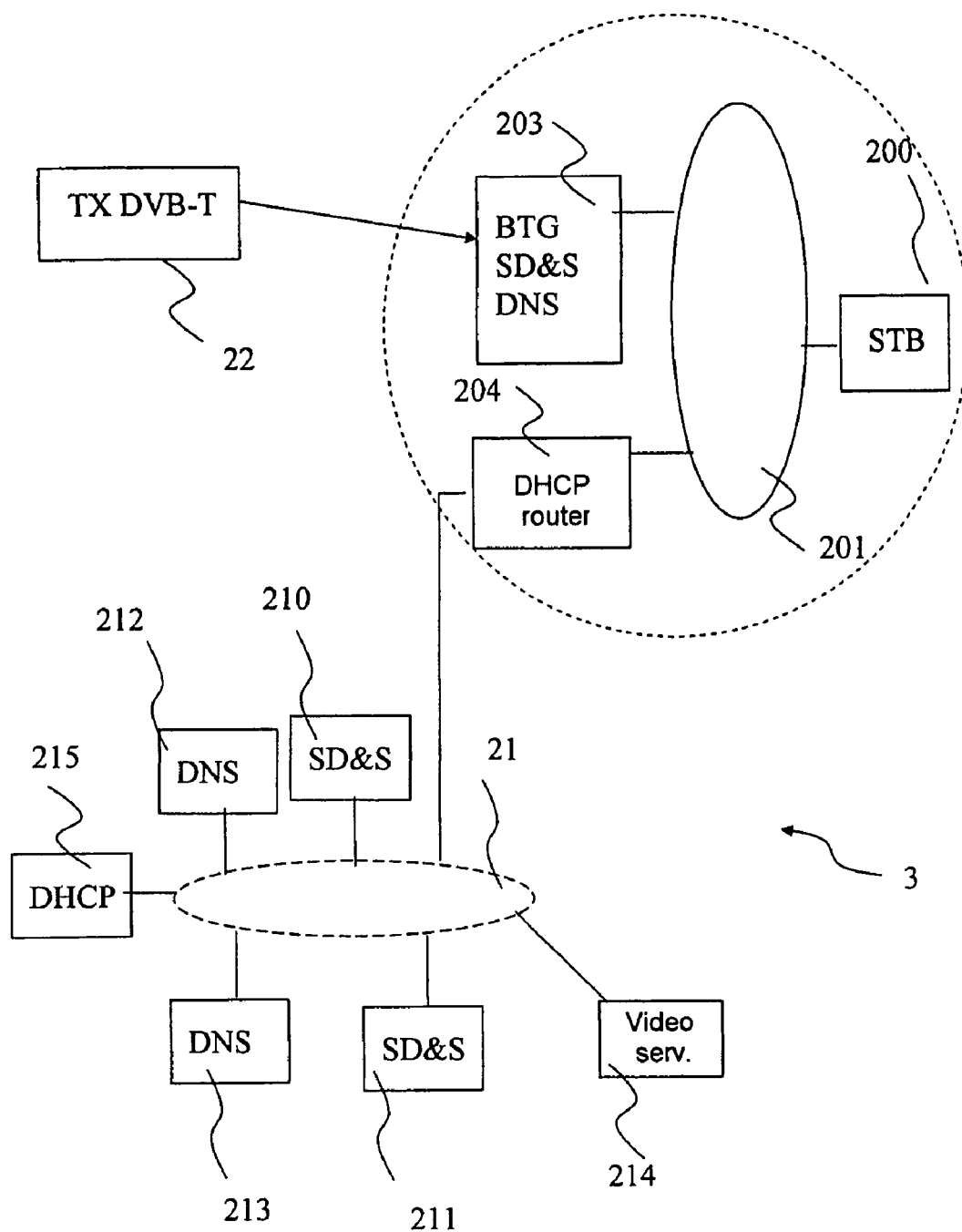
Figure 7:
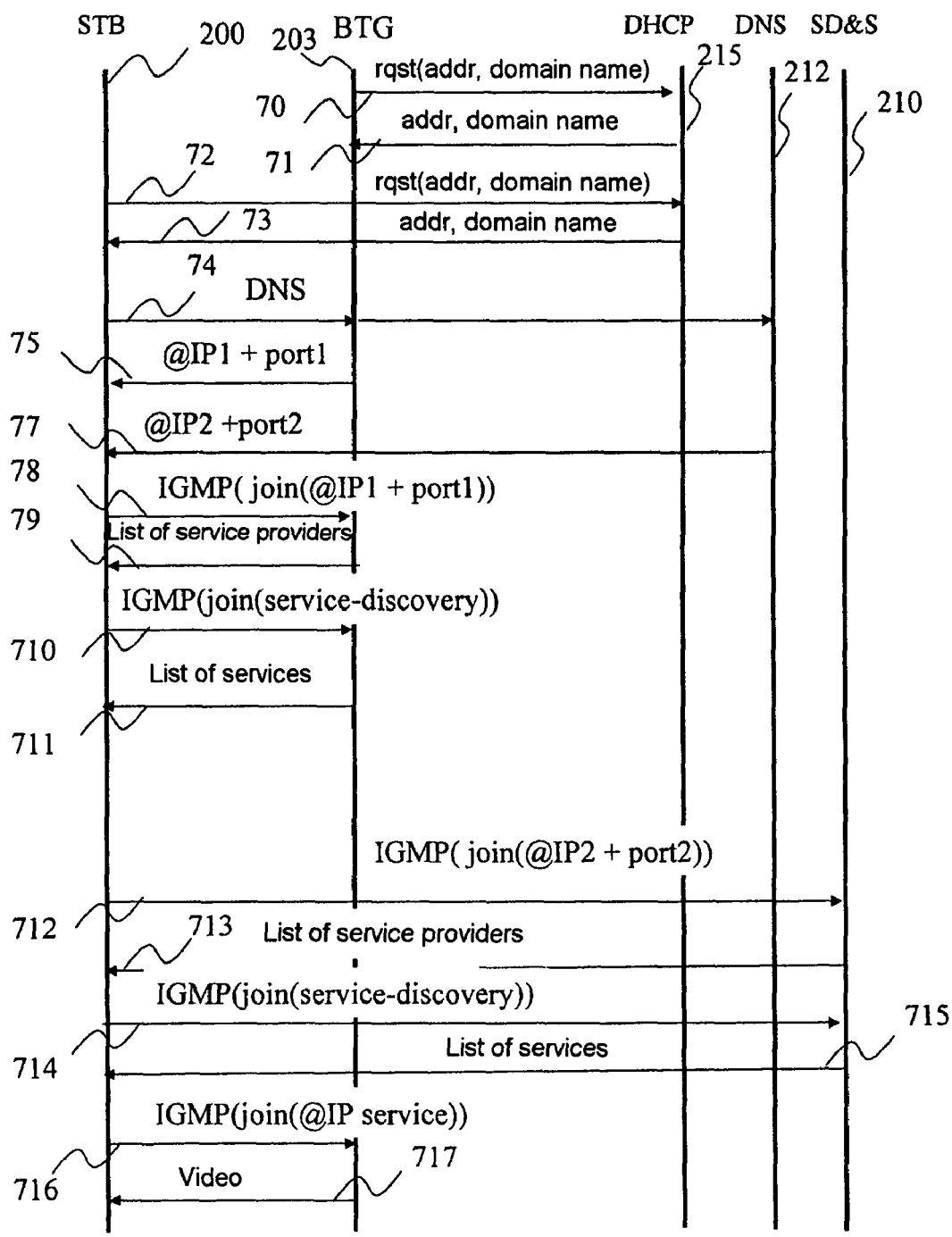
Figure 8:
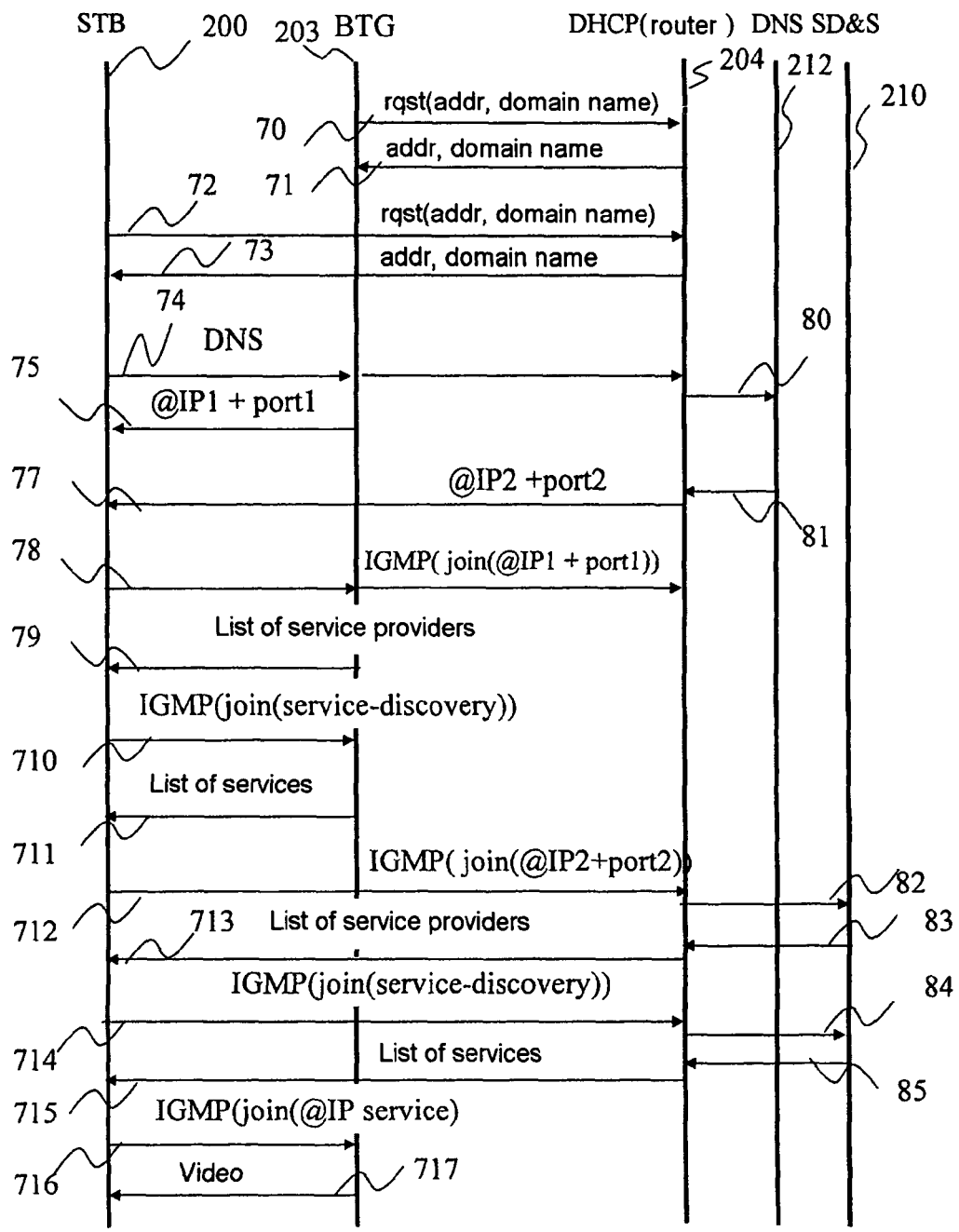
Figure 9:
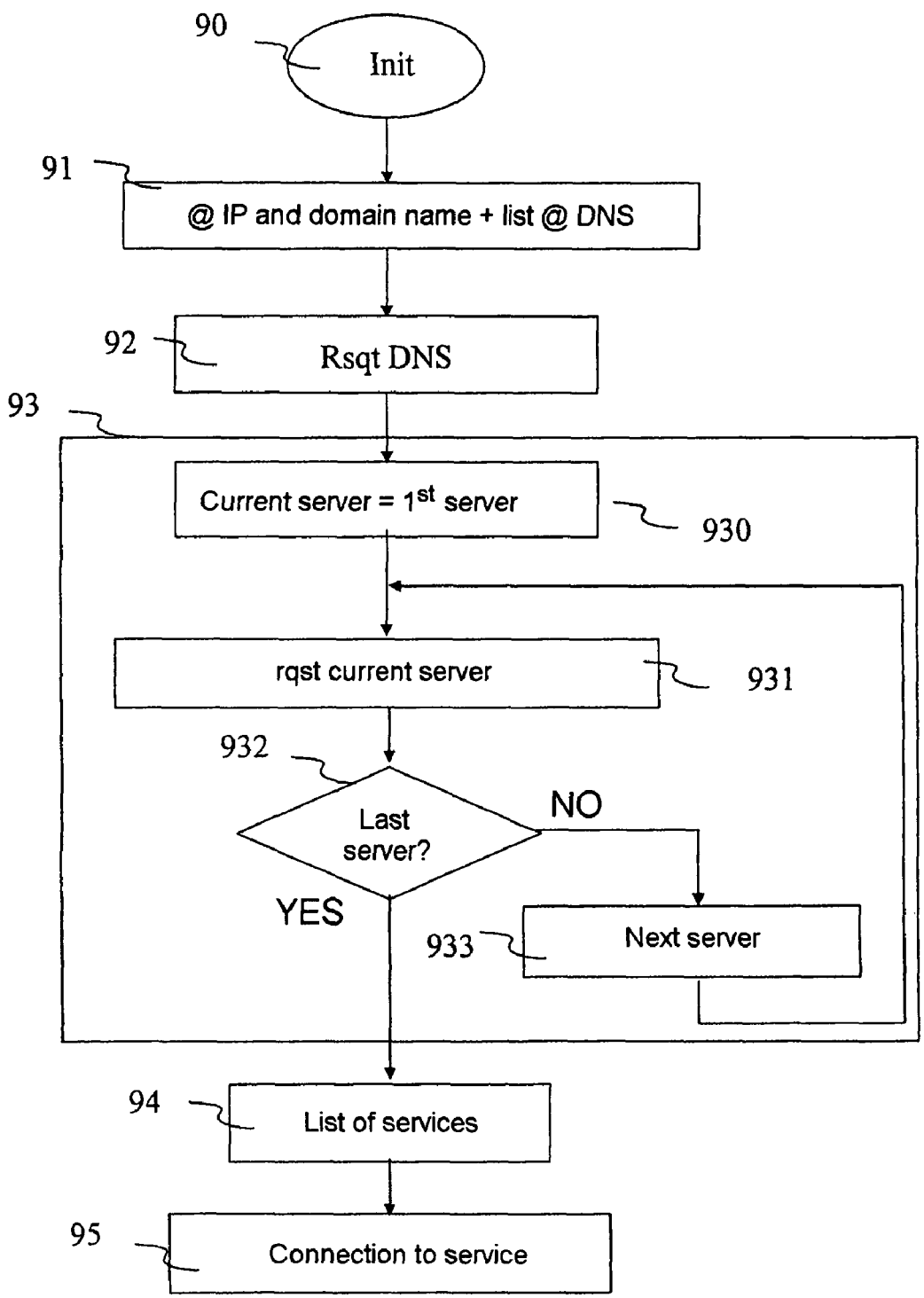

FIGS. 7 and 8 present a communication protocol between elements of the networks of FIG. 2 or 3; and FIG. 9 illustrates an algorithm implemented in the terminal of the networks of FIGS. 2 and 3.

5. DETAILED DESCRIPTION OF THE INVENTION

FIG. 2 presents a schematic diagram of an infrastructure of a network 2 implementing a particular embodiment of the invention with a terminal 200 linked to a wire-based network 21 via a modem and to a wireless network of the DVB-T type via a gateway 203.

The network 2 comprises a terminal or decoder (or STB from the English "Set Top Box") allowing a user to receive a video or audio stream sent by a video server 214 belonging to a network 21 of internet type, for example of ADSL (or "Asymetric Data Subscriber Line") type or by a DVB-T sender 22.

The wire-based network 21 comprises:
- a DHCP server 215 which allows the allocation of an IP and sub-network address to the terminal 200;
- two DNS servers 212 and 213; and
- two SD&S servers 210 and 211 which allow the terminal 200 to discover services.

The terminal 200 belongs to a domestic network 20 itself comprising:
- an infrastructure 201;
- a modem 202 linking the terminal 200 to the wire-based network 21 via the infrastructure 201;
- a gateway 203 suitable for receiving streams transmitted by the DVB-T sender 22 and transmitting them to the terminal 200 via the infrastructure 201.

The gateway 203 also comprises an integrated SD&S server and an integrated DNS server.

The terminal 200 is compatible with the DVB-IP protocol. According to the invention, it can receive services at one and the same time from the internet network 21 and from the network for transmitting video services comprising the sender 22.

The EPDP protocol (or "Entry Point Discovery Protocol" associated with DVB-IP such as defined in the standard ETSI TS 102 034 (entitled "Transport of MPEG-2 Based DVB Services over IP Based Networks") of March 2005) implies that, according to the state of the art, the search for entry points stops as soon as an entry point is found (see paragraph 5.2.4 of the standard TS102034). Also, this standard in its version of March 2005 is poorly suited when several entry points (or access points) offering different services or different conditions for transmitting services, can be offered to a user.

Moreover, according to the EPDP protocol, there exists a network provision option (or "*Network Provisioning Option*") which allows a terminal to preserve in its memory a default SD&S entry point address. If the resolution of this entry point is valid, according to the state of the art, the search stops at this level. According to the invention, even if this option is implemented, the terminal will, perform a search for another entry point and in particular an entry point associated with the gateway 203.

In order to simplify the description, the network 2 is represented with a single terminal. Of course, the network 2 can comprise numerous terminals suitable for receiving services.

FIG. 3 presents a schematic diagram of an infrastructure of a network 3 implementing a particular embodiment of the invention with a terminal 200 linked to the wire-based network 21 via a router 204 with a DHCP functionality and to a wireless network of the DVB-T type via a gateway 203.

The networks 2 and 3 differ through the modem 202 which is replaced with the router 204. The other elements of the network 3 are identical to those of the network 2. They bear the same references and will not be described further.

According to variant embodiments of the invention, the gateway 203 comprises reception means for receiving streams transmitted by several senders (for example a DVB-T (terrestrial) sender and a DVB-S (satellite) sender). According to these variants, the gateway 203 transmits one or more streams received to one or more terminals of a local network.

According to other variants, the local network comprises one or more terminals and at least two gateways, the gateways being associated with different sets of senders. Thus, for example, a first gateway can receive a DVB-T stream and a second gateway can receive DVB-S streams sent by various satellites and corresponding to different services. According to these variants, the gateways 203 transmit one or more streams received to one or more terminals of a local network.

Figure 4:
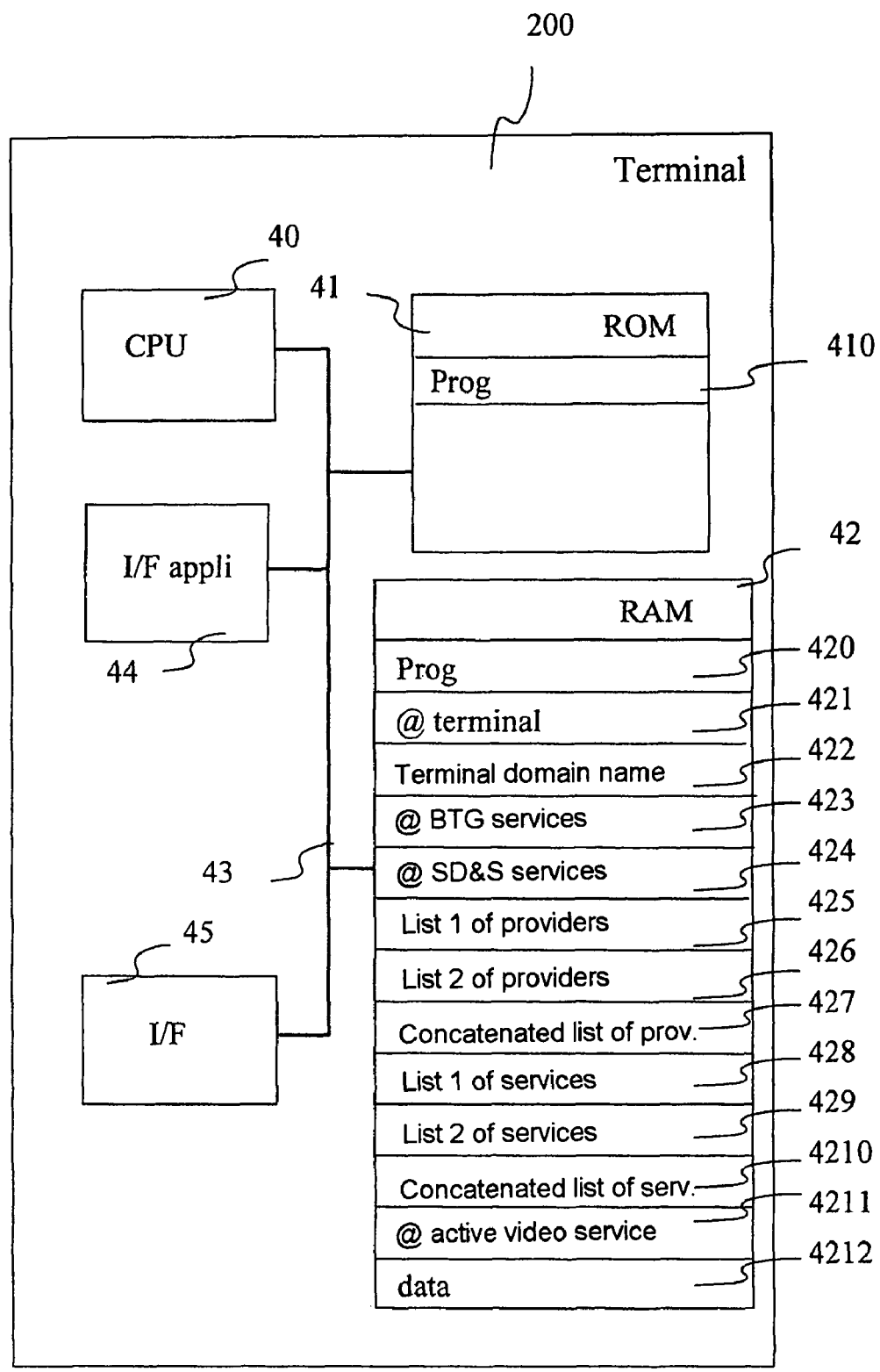
FIGS. 4 to 6 illustrate elements of the networks of FIG. 2 or 3.

FIG. 4 schematically illustrates the terminal 200.

The terminal 200 comprises, linked together by an address and data bus 43:
- a microprocessor 40 (or CPU);
- a nonvolatile memory of ROM type (from the English "Read Only Memory") 41;
- a random access memory or RAM (from the English "Random Access Memory") 42;
- an internet interface 45 allowing the reception and the transmission of internet data (for example data transmitted and/or received by the infrastructure 201); and
- an interface 44 transmitting the images received to the audio/video application (for example for display or recording).

Moreover, each of the elements illustrated in FIG. 4 is well known to the person skilled in the art. These common elements are not described here.

It is observed that the word "register" used in the description designates in each of the memories mentioned, both a memory area of small capacity (a few binary data) and also a memory area of large capacity (making it possible to store an entire programme or all or some of the data representative of an audio/video service received).

The ROM memory 41 comprises in particular:
a programme "prog" 410.

According to the variant that provides for a network provision option, the ROM memory 41 furthermore comprises a default SD&S entry point address.

The algorithms implementing the steps of the method described hereafter are stored in the ROM memory 41 associated with the terminal 200 implementing these steps. On power-up, the microprocessor. 40 loads and executes the instructions of these algorithms.

The random access memory 42 comprises in particular:
- in a register 420, the programme for operating the microprocessor 40 loaded on power-up of the terminal 200;
- the IP address of the terminal 200 in a register 421;
- the name of the domain associated with the terminal in a register 422;
- the IP address and the port of a service rendered by the gateway 203 in a register 423;
- the IP address and the port of the service rendered by an SD&S server of the network 21 in a register 424;
- a list 425 of service providers, transmitted by the gateway 203;
- a list 426 of service providers, transmitted by SD&S servers of the network 21;
- a concatenated list 427 of service providers;
- a list of services 428 associated with the sender 22;

a list of services 429 associated with servers of the network 21;

a concatenated list of services 4210;

an address 4211 of video server transmitting a video service received by the terminal 200; and audio/video data corresponding to one or more streams received in a register 4212.

Figure 5:
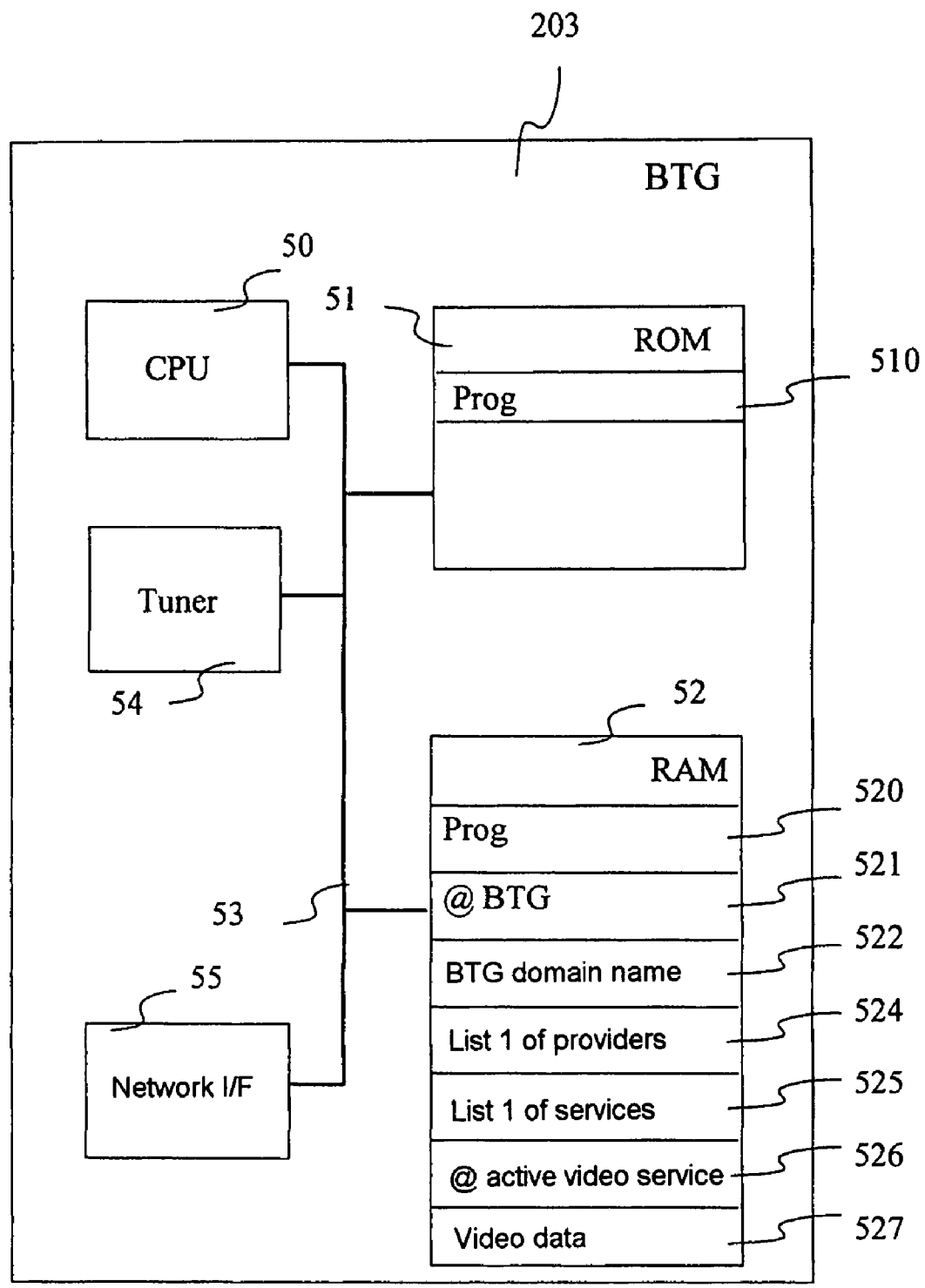

FIG. 5 schematically illustrates the gateway 203.

The gateway 203 comprises, linked together by an address and data bus 53:

a microprocessor 50 (or CPU);

a nonvolatile memory of ROM type (from the English "Read Only Memory") 51;

a random access memory or RAM (from the English "Random Access Memory") 52;

a network interface 55 allowing exchange of data with the terminal 200 via the infrastructure 201; and a tuner 54 allowing the reception of services transmitted by the sender 22.

Moreover, each of the elements illustrated in FIG. 5 is well known to the person skilled in the art. These common elements are not described here.

The ROM memory 51 comprises in particular:

a programme "prog" 510.

The algorithms implementing the steps of the method described hereafter are stored in the ROM memory 51 associated with the gateway 203 implementing these steps. On power-up, the microprocessor 50 loads and executes the instructions of these algorithms.

The random access memory 52 comprises in particular:

in a register 520, the programme for operating the microprocessor 50 loaded on power-up of the gateway 203;

the IP address of the gateway 203 in a register 521;

the name of the domain associated with the gateway 203 in a register 522;

a list 524 of service providers known by the gateway 203, constructed on the basis of the streams received via the tuner 54 and converted to an SD&S compatible format (the list 524 is conveyed by the SD&S mechanism specific to the gateway 203) and that can be transmitted to the terminal 200;

a list of services 525 associated with the sender 22 and known by the gateway 203, the list 525 being constructed on the basis of the streams received via the tuner 54 and converted to an SD&S compatible format;

an address 526 of an active video service (service transmitted to the terminal 200 and allowing the tuner 54 to decode the corresponding multiplex and to extract the service from it); and audio/video data corresponding to one or more streams received from the sender 22 and transmitted to the terminal 200, in a register 527.

Figure 6:
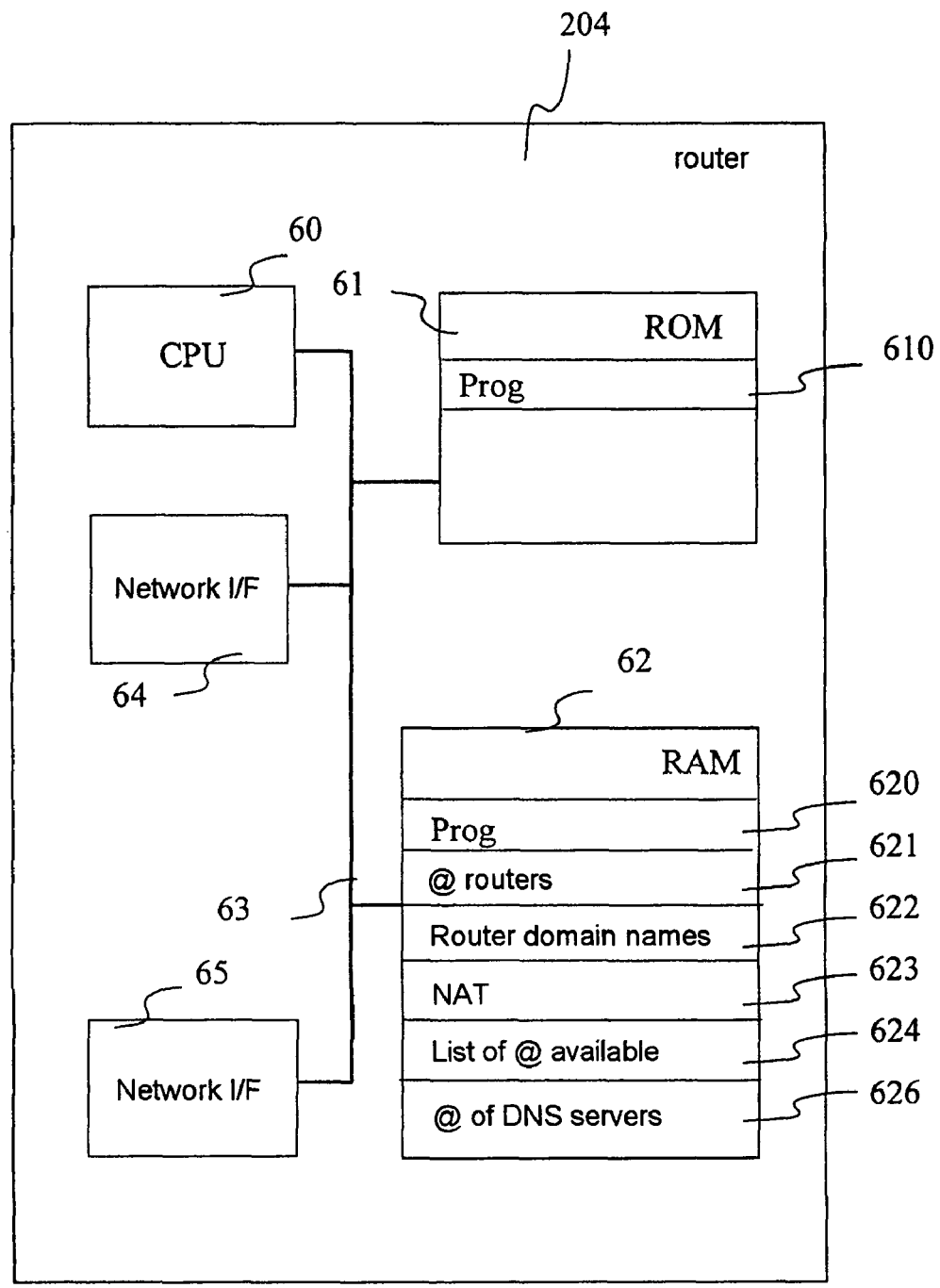

FIG. 6 schematically illustrates the router 204.

The router 204 comprises, linked together by an address and data bus 63:

a microprocessor 60 (or CPU);

a nonvolatile memory of ROM type (from the English "Read Only Memory") 61;

a random access memory or RAM (from the English "Random Access Memory") 62; and a network interface 64 allowing exchange of data with the terminal 200 via the infrastructure 201; and a network interface 65 allowing exchange of data with the network 21;

Moreover, each of the elements illustrated in FIG. 6 is well known to the person skilled in the art. These common elements are not described here.

The ROM memory 61 comprises in particular:

a programme "prog" 610.

The algorithms implementing the steps of the method described hereafter are stored in the ROM memory 61 associated with the router 204 implementing these steps. On power-up, the microprocessor 60 loads and executes the instructions of these algorithms.

The random access memory 62 comprises in particular:

in a register 620, the programme for operating the microprocessor 60 loaded on power-up of the router 204;

the IP addresses of the router 204 corresponding respectively to the networks 21 and 201 in a register 621;

the name of the domain associated with the router 204 in a register 622;

the correspondence between the addresses of the domains of the networks 21 and 201 of the NAT (or "Network Address Translator") type in a register 623;

a list 624 of DHCP servers with service addresses available on the network 21; and a list 626 of addresses of DNS servers on the network 21.

FIG. 7 presents a communication protocol between elements of the network illustrated in FIG. 2 and, more precisely between the terminal 200, the gateway 203, the DHCP server 215, the DNS server 212 and the SD&S server 210. The terminal 200 and the gateway 203 have direct access to the network 21 to which they belong.

In the course of a first step, the gateway 203 transmits a request 70 for an IP address and domain name to the DHCP server 215, according to a DNS/DHCP protocol.

The DHCP server 215 responds with a message 71 containing the IP address and the domain name allocated to the gateway 203, according to a DNS/DHCP protocol. The gateway 203 receiving the domain name configures its own DNS server so as to respond to a DNS request 74 which will can be transmitted to it by the terminal 200.

Independently, the terminal 200 transmits a request 72 for an IP address and domain name to the DHCP server 215.

The DHCP server 215 responds with a message 73 containing the IP address and the domain name allocated to the terminal 200.

Thereafter, the terminal 200 instigates a search for an entry point where it will be able to find services according to an EPDP protocol. According to the invention, the terminal addresses itself at one and the same time to the gateway 203 (local element) and to remote elements of the wire-based network so as to obtain at least two entry points.

Thus, the terminal 200 transmits a request 74 intended for the DNS servers for the domain name resolution adjoined to a prefix of the type _dvbservdsc._tcp. Following the receipt of the request 74, the DNS servers capable of resolving the domain name associated with the prefix respond to the terminal 200 with an IP address and a service port.

Thus, a DNS server present in or associated with the gateway 203 responds with a message 75 containing the IP address and the port of the service rendered by the gateway 203 (this involves an address resolution performed by the gateway 203 as a function of a service name). The terminal 200 stores these data in the register 423.

The DNS server 212 responds with a message 77 containing the IP address and the port of the service rendered by a single SD&S server of the network 21 (by way of illustration, the SD&S server 210 is chosen).

Advantageously, the responses 75 and 77 are transmitted rapidly after the request 74 so as to be received before the expiry of a timeout instigated by the terminal when the request 74 is sent.

According to a variant of the invention, a mechanism is provided for preventing conflict in the transmission of the DNS information, it being possible for the same address ranges to be used by the gateway 203 and a server of the network 21 (in particular, if the IGMP version is earlier than v3) (or possibly one or more other gateways). Also, according to this variant, before transmitting the message 75, the gateway 203 verifies the content of the message 77 (and responses transmitted by the possible other gateways) so as to determine different multicast addresses.

As indicated previously, according to the standard ETSI TS 102 034, the SD&S server discovery stops on the network 201. On the other hand, as indicated hereafter, according to the invention, the SD&S server or entry point discovery makes it possible to have access to at least two SD&S servers.

Thereafter, the terminal 200 transmits an IGMP request 78 ("join" command with parameters received through the message 75) so as to begin listening to a multiple transmission channel (from the English "multicast") corresponding to the multicast transmission address and to the identifier of the port, (the address and the port being transmitted through the message 75 or default port if the port has not been transmitted with the message 75) so as to obtain a list of service providers associated with the gateway 203. The terminal therefore receives a stream 79 transmitted by the gateway 203 and containing the IP address and the port of the service of each service provider that is associated therewith. The terminal stores these data in the register 425.

According to a variant of the invention, a mechanism is provided for preventing conflict in the transmission of the SD&S information and video information, it being possible for the same address ranges to be used by the gateway 203 and a server of the network 21 (in particular, if the IGMP version is earlier than v3) (or possibly one or more other gateways). Also according to a first variant, the terminal 200 firstly interrogates the servers of the network 21 (and the possible other gateways already connected) before interrogating the gateway 203, the gateway 203 beginning to listen to the multicast streams transmitted by the servers of the network 21 so as to choose addresses (of service providers and services) that are free. According to a second variant, if the terminal 200 firstly interrogates the gateway 203, the gateway 203 verifies the IGMP version of the message 78; if this version is earlier than version v3, the gateway 203 itself sends IGMP requests to the network 21 (and the possible other gateways) so as to ascertain the addresses of the services and of the service providers in order to choose free addresses.

Then, the terminal 200 chooses a provider whose address is stored in the register 425 and transmits one or more IGMP requests 710 ("join" command with parameters corresponding to the chosen provider) so as to begin listening to a multiple transmission channel corresponding to this or these providers of the list received with the stream 79 and thus obtain a list of services provided by this provider. The terminal receives and stores in the register 428 a stream 711 containing the list of the services associated with the provider.

Thereafter, the terminal 200 transmits an IGMP request 712 ("join" command with parameters received through the message 75) so as to begin listening to a multiple transmission channel (from the English "multicast") corresponding to the multicast transmission address and to the identifier of the port, (the address and the port being transmitted by the message 77 or default port if the port has not been transmitted with the message 77) so as to obtain a list of service providers associated with the server 21. The terminal therefore receives a stream 713 transmitted by the SD&S server 21 and containing the IP address and the port of the service of each service provider that is associated therewith. The terminal stores these data in the register 426.

Then, the terminal 200 chooses a provider whose address is stored in the register 426 and transmits one or more IGMP requests 714 ("join" command with parameters corresponding to the chosen provider) to the SD&S server 21 so as to begin listening to a multiple transmission channel corresponding to this or these providers of the list received with the stream 79 and thus obtain a list of services provided by this provider. The terminal receives and stores in the register 429 a stream 715 containing the list of the services associated with the provider.

The terminal 200 then chooses a service from among the services present in the registers 428 and 429 or, according to a variant, in a register 4210 comprising the result of a concatenation (and possibly selection) of services stored in the registers 428 and 429. As illustrated in FIG. 6, if the terminal 200 chooses a service via the gateway 203, it sends it a "join" command 716 containing the address of the service desired according to the IGMP protocol. It then receives a video stream 717 from the gateway that it can transmit to the application via the interface 44. If the terminal 200 chooses a service via the network 21 (case not illustrated in the figure), it sends it a "join" command containing the address of the service desired according to the IGMP protocol to the corresponding video server of the network 21 and it receives a video stream from the video server via the modem 202.

By way of illustration, if a domain name received from a DHCP server is "dvbip.multi.com", the DNS server 212 and the DNS server associated with the gateway 203 can have two distinct IP addresses (for example 192.168.1.1. and 192.168.1.2) and have the same DNS resolution for the name_dvbservdsc._tcp corresponding to the domain name provided to the terminal 200 by the DHCP server 215. Also, according to the invention, the DNS requests 74 and 76 from the terminal 200 to resolve the name _dvbservdsc._tcp.dvbi-p.thmulti.com will be resolved with the two addresses 192.168.1.1 and 192.168.1.2 (messages 75 and 77). Thereafter, the terminal 200 can receive the desired information about the service providers by addressing itself directly to the gateway 203 and to the SD&S server 210 (messages 78 and following).

FIG. 8 presents a communication protocol between elements of the network illustrated in FIG. 3, and, more precisely between the terminal 200, the gateway 203, the router 204, the DNS server 212 and the SD&S server 210. The terminal 200 has indirect access to the network 21, via the router 204.

The exchanges and streams illustrated in FIG. 8 are similar to the exchanges and streams presented in FIG. 7 and bear the same references; nevertheless the DHCP router 204 replaces the DHCP server 215 for the messages or streams 70 to 73. Furthermore, the messages to or from the DNS server 212 are effected via the router 204; thus, the router 204 receives the message 74 that it forwards to the DNS 212, in the form of a message 80 by performing the address conversion; then, it receives from the DNS 212, a response 81 that it forwards in the form of the message 77 to the terminal 200. Likewise, the messages to or from the SD&S server 210 are effected via the router 204; thus, the router 204 receives the message 712 (respectively 714) that it forwards in the form of a message 82 (respectively 84) to the SD&S 210; then, it receives from the SD&S DNS 210 a stream 83 (respectively 85) that it forwards 713 in the form of the stream 713 (respectively 715) to the terminal 200 (according to a variant, following the message 712, the router 204 filters the stream corresponding to the IGMP request or allows it through to the terminal 200).

Advantageously, the router 204 also filters the stream 717 transmitted by the gateway 203 to the terminal 200.

FIG. 9 illustrates an algorithm for discovering a service and connecting to a service, implemented in the terminal 200.

In the course of an initialization step 90, the terminal 200 updates the various parameters and variables.

Thereafter, in the course of a step 91, the terminal 200 recovers its IP address and the corresponding domain name (messages 70 to 73) that it stores. The terminal 200 also stores a list of addresses of DNS servers (in particular DNS servers associated with the gateway 203 and DNS servers 212 and 213).

Then, in the course of a step 92, for each DNS server whose address has been stored, the terminal 200 transmits a DNS request so as to obtain SD&S server addresses associated with service names) (messages 74 to 77). Thus, the terminal 200 receives from a DNS server of the network 21, an IP address and the port of an SD&S server and an address and the port corresponding to services available via the gateway 203.

Thereafter, in the course of a step 93, for each SD&S address received during step 92, the terminal 200 interrogates the corresponding SD&S server and receives a list of service providers. According to the invention, the terminal 200 interrogates not only the SD&S server present on the network 21 but also the gateway 203 which plays this role. Thus, advantageously and contrary to the state of the art, the terminal has access to several SD&S servers and can thus benefit from varied service sources.

More precisely, step 93, according to a particular embodiment, can be divided into several steps 930 to 933. In the course of step 930, the terminal 200 initializes a current server variable or pointer on the first server of the list of SD&S servers. Then, in the course of a step 931, it receives from the current SD&S server a list of service providers (messages 78 and 712), with the address of each service provider known to the SD&S server (messages 79 and 713) and stores the service provider addresses received. In the course of a test 932, the terminal verifies whether the current server is the last of the list of SD&S servers. If not, in the course of a step 933, it updates the current server by making it point at the next server in the list of SD&S servers and step 931 is repeated.

If not, step 92 is terminated, and, in the course of a step 94, for each SD&S server, the terminal asks for the list of the services associated with a service provider (messages 710 and 714), receives a response (messages 711 and 715), stores the list of services received with the corresponding provider and transmits them to the application so that the latter can present them to the user.

Then, in the course of a step 716, the user having chosen a particular service from among the lists received, the terminal 200 accesses the corresponding service and receives it (command 716 and stream 717). If one and the same service is distributed via the network 21 and the gateway 203, the user can choose the service on the basis of the origin thereof. According to a variant, the terminal can be configured so as to favour an origin (by via the gateway 203 so as to economize on the bandwidth or via the network 21 so as to have a better quality of reception, or else, by taking account of the quality associated with the source coding of a service).

Of course, the invention is not limited to the embodiments described above.

In particular, the invention relates to domestic or professional systems that access two networks through two distinct access points. The first network is, for example, a wireless or wire-based internet type network. The second network is, for example, a network dedicated to the transmission or distribution of audio/video services (for example DVB-T or DVB-S network).

According to the invention, several audio/video devices in a network (for example domestic network or local company network) can receive services originating from several sources via several access points, for example, via a modem or a router connected to an internet network, a gateway receiving transmitted services, a local server (for example, a device for reading prerecorded data). The invention therefore makes it possible to discover the whole set of services provided according to a DVB-IP protocol.

The invention claimed is:

1. Method of receiving audio/video services, said method comprising transmission of a name resolution request according to an audio/video services entry point discovery protocol, wherein said method further comprises the following steps:
   receiving, in response to said transmission, of a first address corresponding to a first entry point used for distributing service signalling, said first address being provided by a first name server associated with a first network via a first access point;
   receiving, in response to said transmission, of a second address corresponding to a second entry point used for distributing service signalling, said second address being provided by a second name server associated with a second network via a second access point different from the first access point;
   storing said first address and said second entry point address.

2. Method according to claim 1, wherein said first network is a wired network of the Internet type.

3. Method according to claim 1, wherein said second network is a wireless network.

4. Method according to claim 1, wherein said second network is of the digital video transmission network type.

5. Method according to claim 4, wherein said network is compatible with a standard belonging to a set comprising:
   the DVB-S standard;
   the DVB-T standard.

6. Method according to claim 1, wherein said method further comprises:
   connecting to a stream transmitted on said first address so as to receive a first list of service providers;
   connecting to a stream transmitted on said second entry point address; and
   connecting to a stream transmitted on said second address so as to receive a second list of service providers.

7. Method according to claim 6, wherein said method further comprises:
   connecting to a stream at an address belonging to the first list of service providers so as to receive a first list of services;
   connecting to a stream at an address belonging to the second list of service providers so as to receive a second list of services.

8. Method according to claim 7, wherein said method further comprises:
   selecting a first service belonging to the first list of services or a second service belonging to the second list, and
   receiving the selected service, by the said first access point if the first service is selected and by the said second access point if the second service is selected.

9. Terminal comprising:
   means for transmitting a name resolution request according to an audio/video services entry point discovery protocol, means for receiving, in response to transmission of said name resolution request, of a first entry point address, said first entry point address being used for distribution of service signalling, said first address being provided by a first name server associated with a first network via a first access point;

means for receiving, in response to transmission of said name resolution request, of a second entry point address, said second entry point address being used for distribution of service signalling, said second address being provided by a second name server associated with a second network via a second access point different from the first access point;

means for storing said first address and said second address.

10. System comprising at least one terminal and at least one gateway, said at least one terminal comprising:

means for transmitting a name resolution request according to an audio/video services entry point discovery protocol, means for receiving, in response to transmission of said name resolution request, of a first entry point address, said first entry point address being used for distribution of service signalling, said first address being provided by a first name server associated with a first network via a first access point;

means for receiving, in response to transmission of said name resolution request, of a second entry point address, said second entry point address being used for distribution of service signalling, said second address being provided by a second name server associated with a second network via a second access point different from the first access point; and means for storing said first address and said second address;

and the at least one gateway comprising the said second name server.

* * * * *